(12) United States Patent
Takagawa

(10) Patent No.: US 6,273,306 B1
(45) Date of Patent: Aug. 14, 2001

(54) LID OF THE LIQUID CONTAINER

(76) Inventor: Nobuyuki Takagawa, 5-12-20, Sagisu, Fukushima-ku, Osaka (JP)

(*) Notice: Subject to any disclaimer, the term of this patent is extended or adjusted under 35 U.S.C. 154(b) by 0 days.

(21) Appl. No.: 09/609,414

(22) Filed: Jul. 3, 2000

(51) Int. Cl.[7] ................................................. B22D 37/00
(52) U.S. Cl. .......................................... 222/509; 222/518
(58) Field of Search ................................ 222/465.1, 509, 222/518

(56) References Cited

U.S. PATENT DOCUMENTS

| | | | |
|---|---|---|---|
| 4,638,929 | * | 1/1987 | Stone, Jr. ............................ 222/465.1 |
| 4,658,973 | * | 4/1987 | Zimmermann ....................... 222/518 |
| 5,497,917 | * | 3/1996 | Krimmel et al. ................... 222/465.1 |
| 5,609,194 | * | 3/1997 | Link et al. ......................... 222/465.1 |
| 5,699,841 | * | 12/1997 | Takagawa ............................ 222/509 |

* cited by examiner

Primary Examiner—Philippe Derakshani
Assistant Examiner—Thach H Bui
(74) Attorney, Agent, or Firm—Moonray Kojima

(57) ABSTRACT

The present invention relates to the lid of the liquid container, which is appropriate for pouring drinks like coffee dropping out of a coffee maker, more particularly the lid to set on the upper opening part of the liquid container to incline when pouring, wherein the pouring outlet is formed on its upper surface to pour the liquid into the said liquid container, and the pouring way is formed perforating from the said pouring outlet downward and on the below end of the said pouring way, an extension material is extended from the said pouring way, which material is designed to direct the below opening part sideways, so that the above mentioned pouring outlet is perforated into the inner part of the said liquid container, and above the height of the said opening part, there is formed a free space not closing the inner opening part of the liquid container, and on the upper side of the said pouring outlet, the upper lid which opens and closes by support of the hinge is attached, in order that the entry of trashes is deterred, allowing for a smooth pouring of the liquid.

6 Claims, 8 Drawing Sheets

LID OF THE LIQUID CONTAINER

(b) BACKGROUND OF THE INVENTION

1. Field of the Invention

Figure 1:
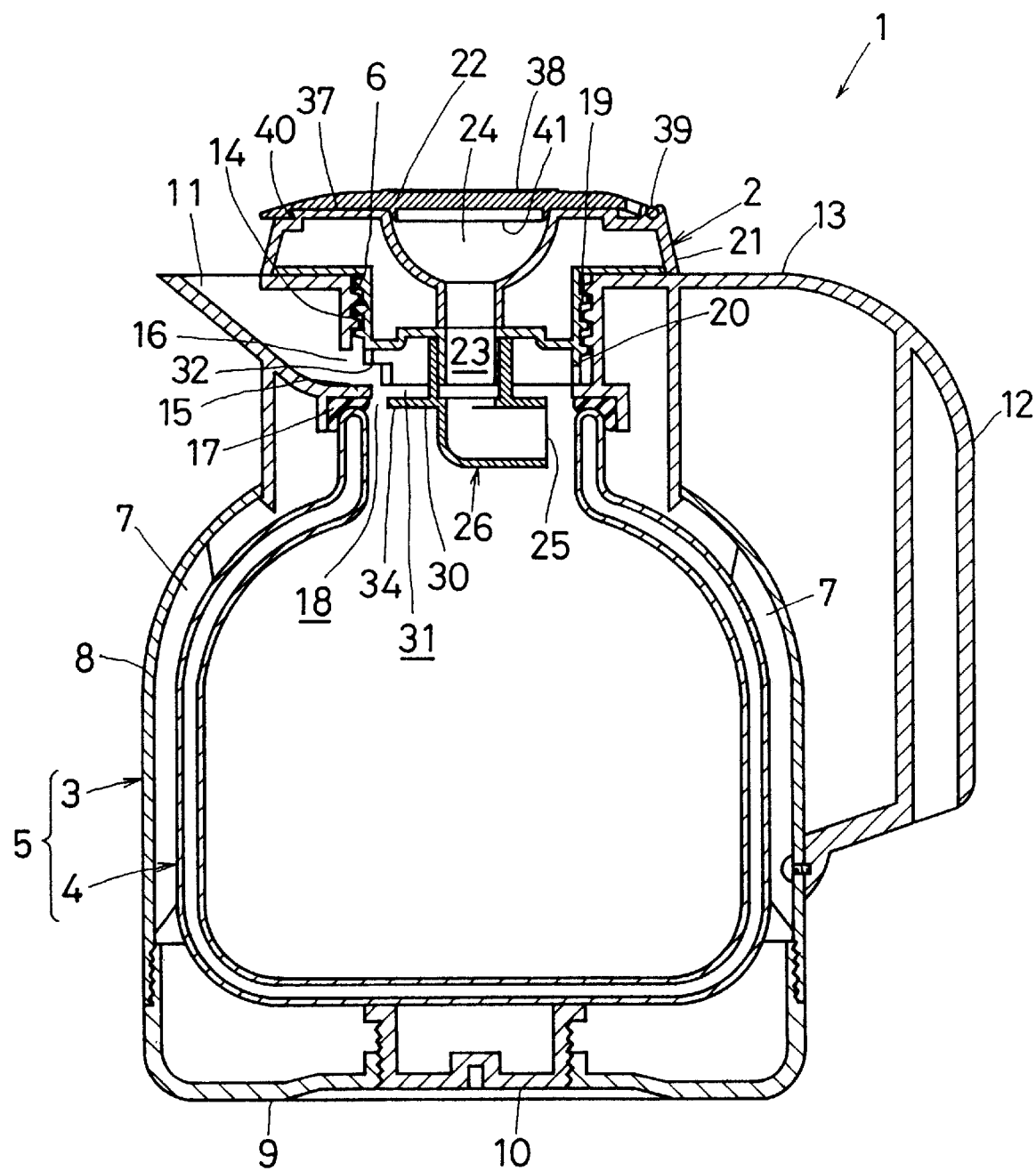

The present invention relates to the lid of the liquid container for containing various drinks like coffee or tea, especially coffee made with a coffee maker.

2. Description of the Prior Art

For the lid described above, there is U.S. Pat. No. 5,609, 194. As for this lid, it is possible to pour the liquid while it is put on and in order to prevent vapor from going away from the contained liquid, there is a device to deviate vapor entering into the said pouring outlet, which device is set on the below side of the pouring outlet perforating from the upper side downward.

However, as the said pouring outlet is formed wide open like a funnel, there is a problem that trashes are easy to enter.

Also, there is a vacuum bottle disclosed in the U.S. Pat. No. 5,699,841. According to this vacuum bottle, on the lid material the upper lid is set to close the pouring outlet so that it has a merit that the entry of trashes can be deterred as much as possible. In addition, in this vacuum bottle, there is set a moving inner lid closing the inner opening part of the container by moving up and down so that it has a merit that it can prevent vapor, odor, tastes, heat and coldness from being lost.

However, according to the construction of the above moving inner lid, there is a case that the pouring can not be done well, as the moving inner lid does not function well when adherent liquid or sticky liquid is poured.

(c) SUMMARY OF THE INVENTION

The main object of the present invention is to deter trashes entering into the container as much as possible and to provide for a smooth pouring of the liquid that may be adherent.

This means that it is to provide a lid to set on the upper opening part of the liquid container which is to be inclined to pour the liquid, wherein the pouring outlet is formed on the upper side in order to pour the liquid into the said liquid container and there is formed a pouring way perforating from the said pouring outlet downward and on the below side of the said pouring way, an extension material is set for inclining the below opening part sideways, the said extension material extended from the above mentioned pouring way, so that the above mentioned pouring outlet is perforated into the inner side of the said liquid container, with a free space above the height of the said opening part, which does not close the inner opening part of the liquid container and on the upper side of the said pouring outlet, the upper lid is attached to the liquid container, which upper lid opens and closes by support of the hinge.

In other words, according to the above mentioned structure, the pouring outlet of the lid can be closed by the upper lid so that it is possible to deter the entry of trashes as much as possible. In addition, above the height of the opening part at the below end of the extension material attached to the lid, there is formed a free space not closing the inner opening part of the liquid container so that there is no structure which might bar the pouring of the liquid and it is possible to obtain a smooth pouring of the liquid that may be adherent.

The present invention will be more particularly described with reference to the accompanying drawings.

(d) BRIEF DESCRIPTION OF THE DRAWINGS

FIG. 1 Cross-sectional view of the vacuum bottle

Figure 2:
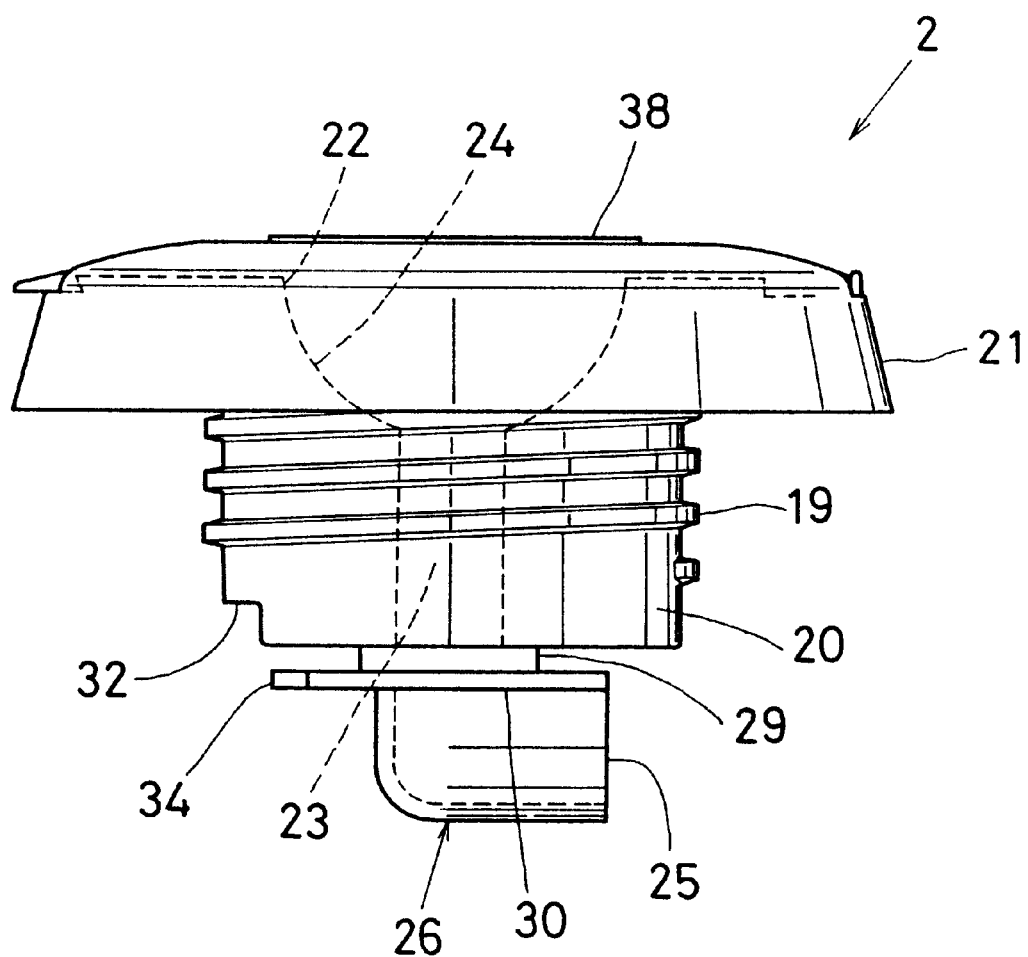

FIG. 2 Side view of the lid

Figure 3:
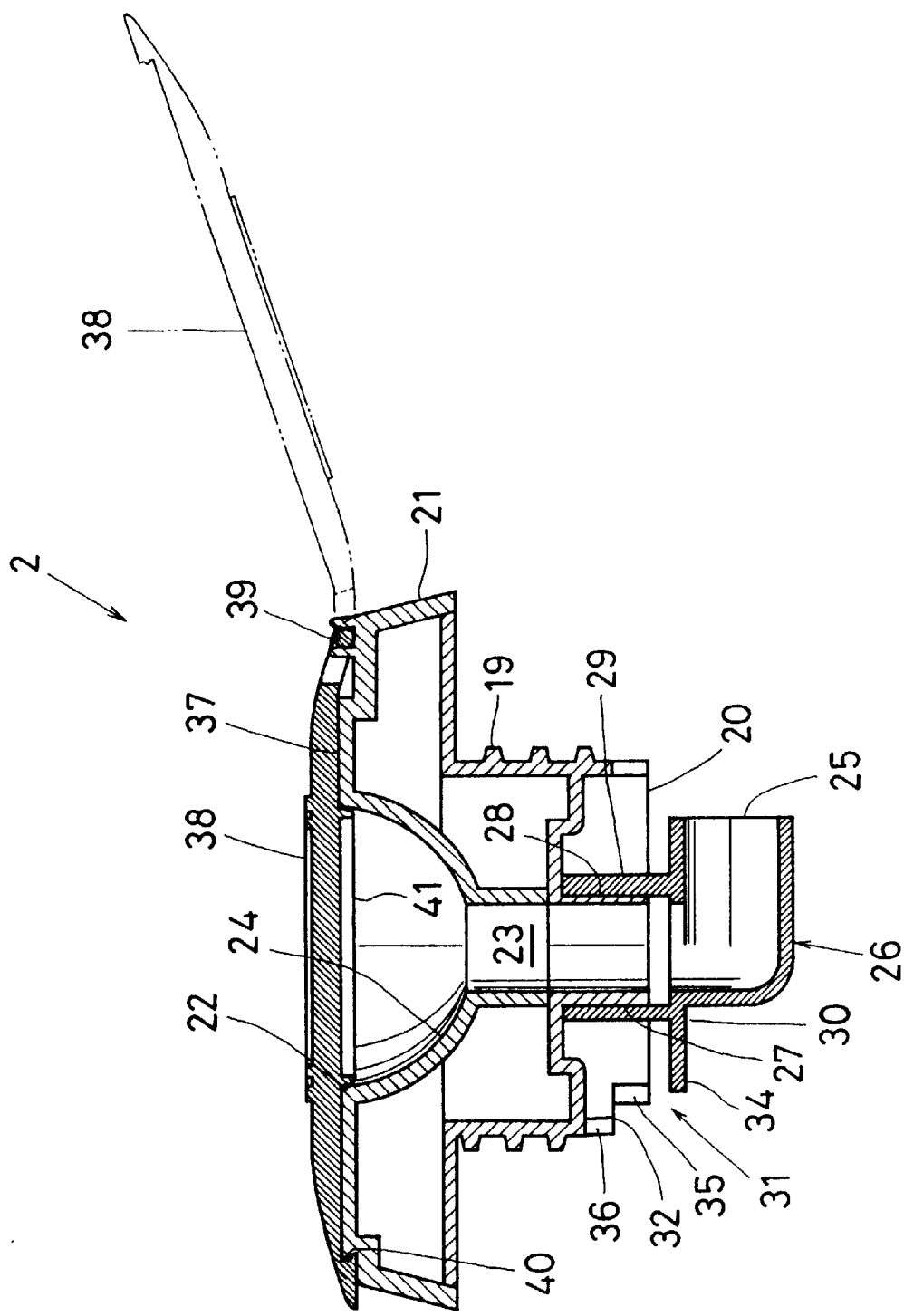

FIG. 3 Cross-sectional view of the lid

Figure 4:
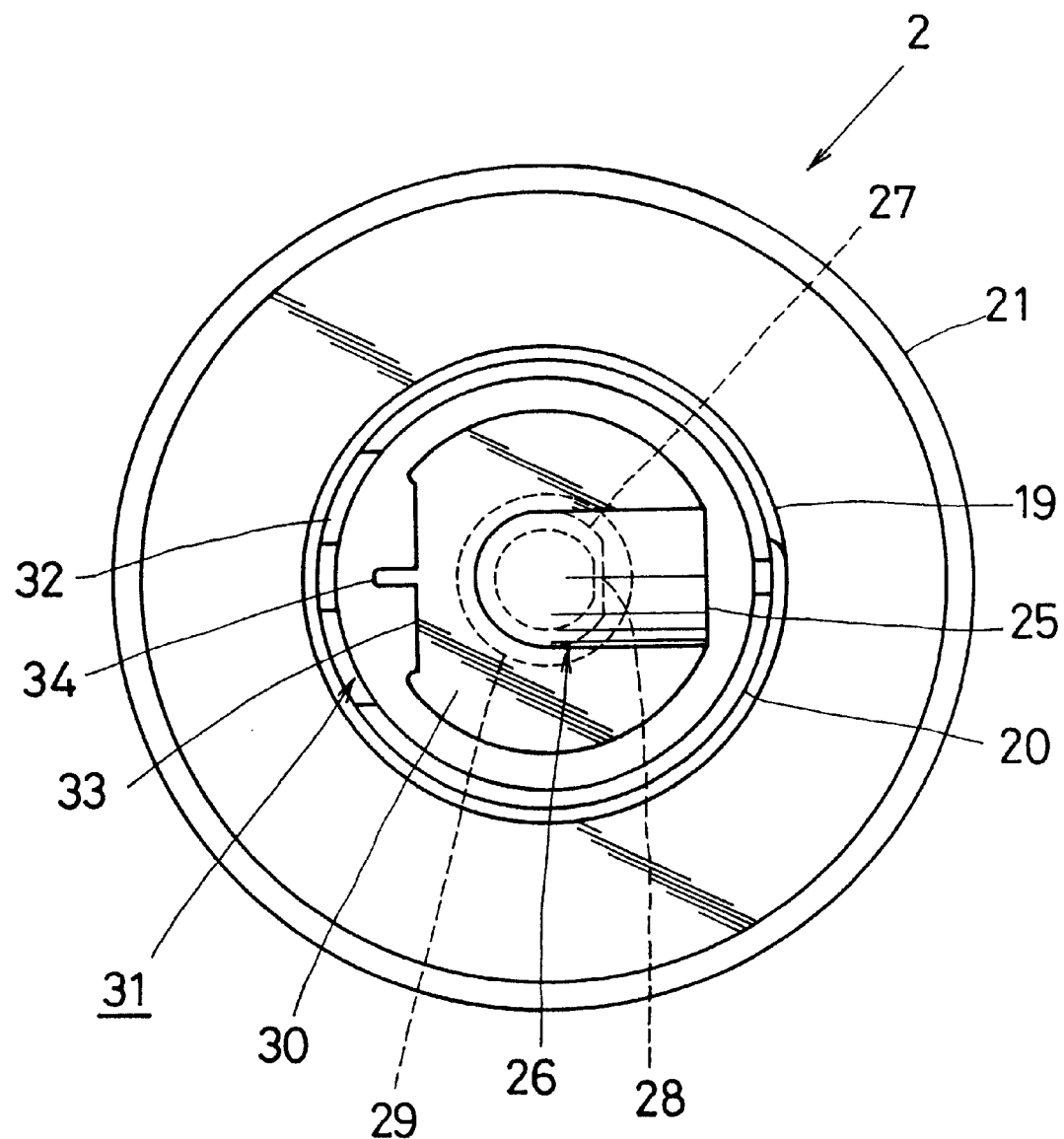

FIG. 4 Bottom view of the lid

Figure 5:
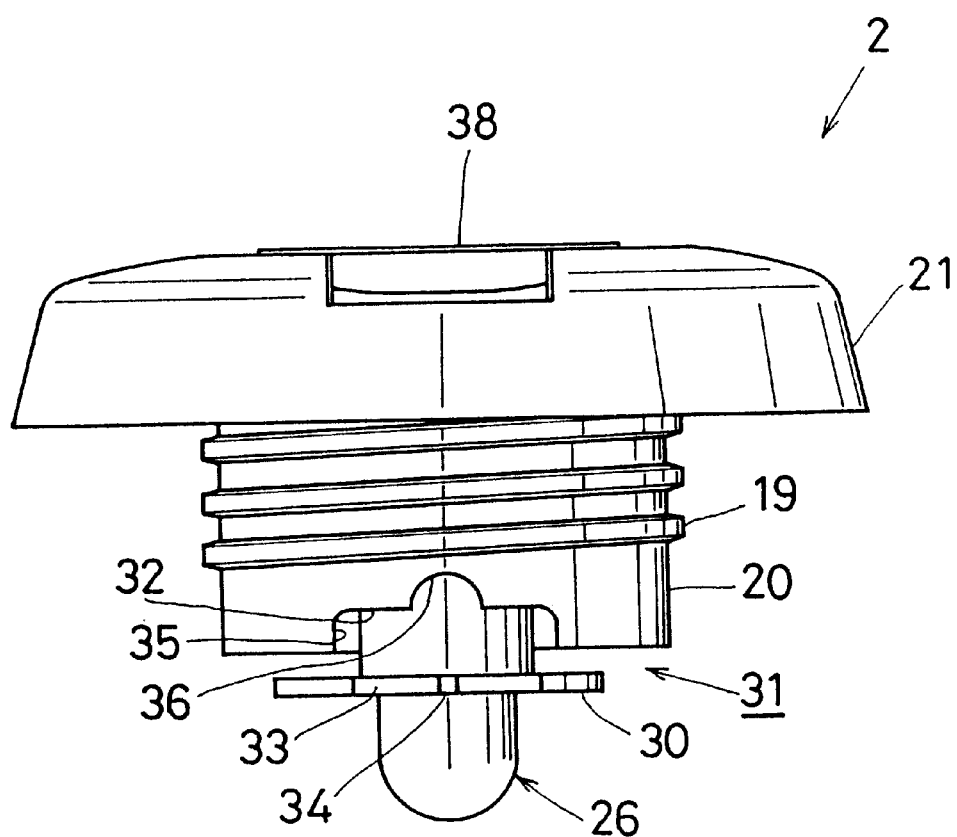

FIG. 5 Front view of the lid

Figure 6:
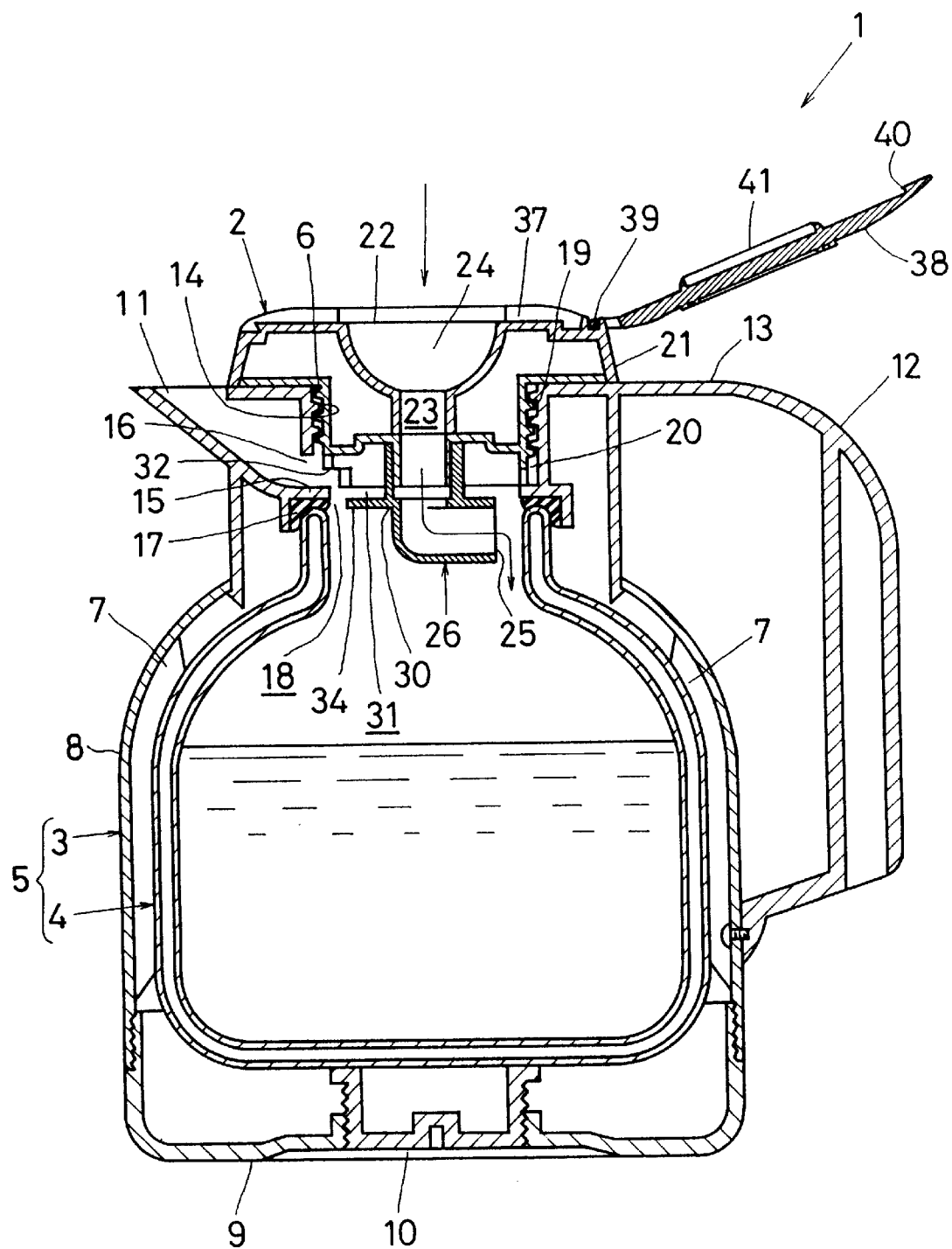

FIG. 6 Cross-sectional view of the liquid being poured into the vacuum bottle

Figure 7:
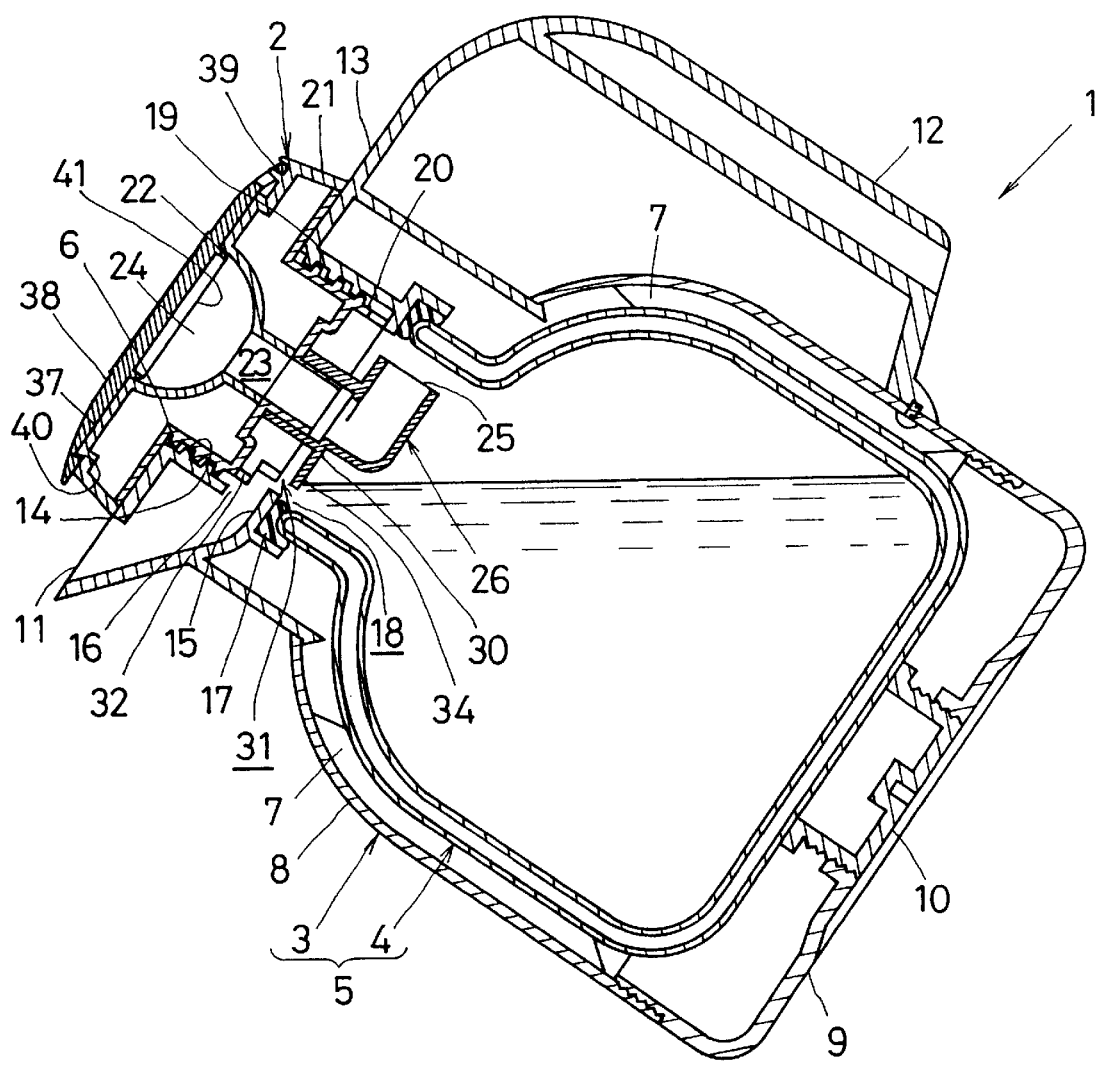

FIG. 7 Cross-sectional view of the liquid being poured from the vacuum bottle

Figure 8:
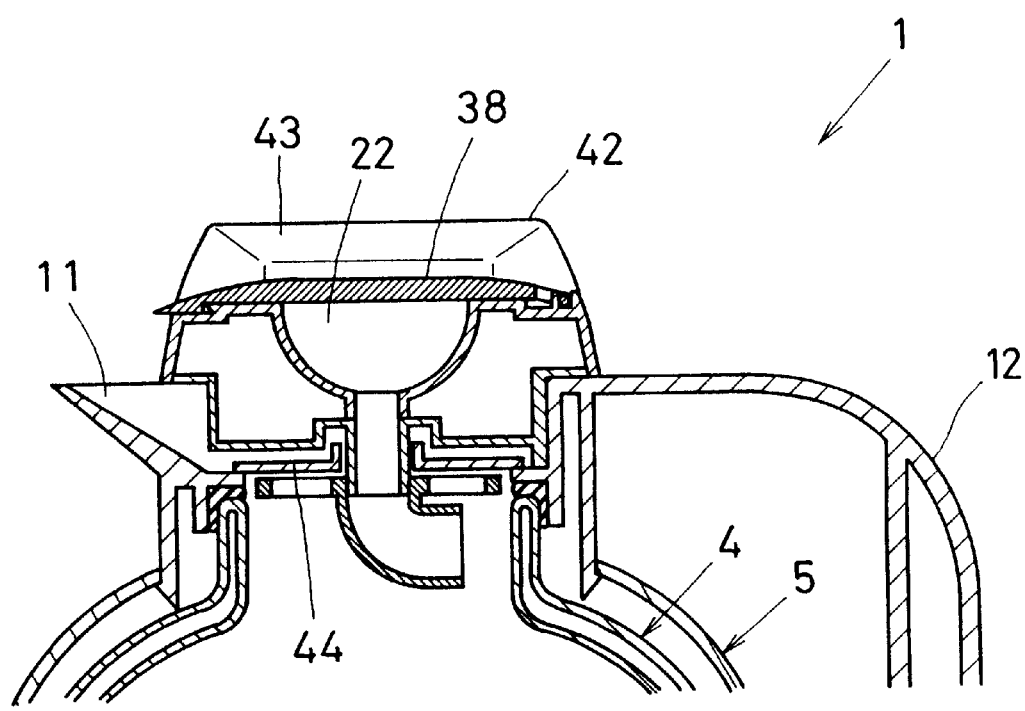

FIG. 8 Cross-sectional view of the preferred embodiment

(e) DESCRIPTION OF THE PREFERRED EMBODIMENT

One of the examples according to the present invention is described below using the drawings.

The vacuum bottle 1 as a liquid container is constructed in such a way as to incline the liquid inside when pouring the liquid out and it is possible to pour the liquid into the container without removing the lid 2.

The vacuum bottle 1 as shown in the FIG. 1 consists of the body 5 comprising the outer container 3 made of a synthetic resin and the inner container 4 made of glass or stainless, which is contained inside, together with the lid 2 screwed to the upper opening part 6 of the said body 5 in a way that allows for setting and removing.

The above mentioned outer container 3 consists of four materials. They are a body material 8 provided with a plural of ribs 7 inside supporting the inner container 4, a bottom material 9 screwed and fixed onto the below opening part of the said body material 8, a support 10 which is screwed to the center of this bottom material 9, supporting the inner container 4, and a supper material 13 comprising the pouring outlet 11 on one side and the grip 12 on another side.

The outer container 3 comprises a round hole corresponding to the said upper opening part, which is formed between the pouring outlet 11 and the grip 12 of the said upper material 13, provided with a female screw in the inner circumference. In addition, the flange 15 is formed below this female screw 14. In a part corresponding to the above mentioned pouring outlet is the pouring way 16 open.

The above mentioned inner container 4 can be contained inside the said flange 15 as it is pushed thereto on the upper end by force of a seal-packing 17 in the form of a ring. In the vicinity of the said flange 15 there is an inner opening part 18 of the body 5 (a liquid container) of the vacuum bottle 1 and through the inner opening part 18 the liquid is poured out.

As shown in the FIG. 2, the lid 2 comprises the upper opening part 6 of the outer container 3, which comprises the screw part 20 being formed in a column and having a male screw 19 on the outer circumference, which part is screwed to the female screw 14 of the upper material 13, togather with the head part 21 formed on the upper side of the screw part 20, which head part is in the shape of a disk of a larger diameter than the said screw part 20.

Furthermore, as for the lid 2, the pouring outlet 22 is formed on its upper surface as shown in the FIG. 3 so that it is possible to pour the liquid inside and at the same time there is formed the pouring way 23 perforating from the pouring outlet 22 thought the said inner opening part 18 downward. There is formed a transitory receiving part 24 which is half round concave on the upper part of the pouring way 23. By formation of this transitory receiving part 24, it is possible to bar the stream of the liquid when pouring the liquid into the container. On the below part of the pouring way 23, there is formed the connecting part 27 which is in the shape of a column in order that the pouring way 23 is extended and attaching the extension material 26, which directs the below opening part 25 sideways. As for this connecting part 27, on a part of its outer circumference, there is formed a plane part 28 as shown with shaded lines, in order to bring the extension material 26 in a determined direction.

The extension material 26 comprises the attaching part 29 which is attached to the above mentioned connecting part 27, below which the square control board 30 of such a size as not to close the inner opening part 18 of the body 5 is formed, below which control board, the said opening part 25 is formed. This opening part 25 is designed in such a manner that it is turned toward the rear direction of the body 5 and when pouring the liquid, the liquid runs the pouring way 23, avoiding the spill. With the vicinity of the inner opening part 18 thus constructed, above the height of the said opening part 25 or above the vicinity of the said control board 30, the free space 31 (open and free from any obstacle), not closing the inner opening part 18 of the body 5, is formed.

At the foot of a cylinder on the below side of the screwing part 20 of the body 2 and in a place corresponding to the pouring outlet 11 of the body 5, the pouring window 32 of an adequate width is cut out as shown in the FIG. 5. In addition, in front of the said control board 30 and on a device corresponding to the said pouring window 32, the part 33 of a width roughly corresponding to the width of the above mentioned pouring window 32 is cut out and in the intermediary location there is formed a stream arranging protrusion 34, which is in the shape of a bar extending in the direction of the pouring outlet 11.

With this construction, when the vacuum bottle 1 is inclined to pour the liquid from the pouring outlet 11, the liquid running through the inner opening part 18 or in the vicinity of the upper end of the container 4 is regulated by the control board 30 and runs out of the front part 33 which is cut out. In this moment, the stream is arranged by the stream arranging protrusion 34, thus running through the pouring window 32 and the pouring way 16, and the liquid goes out of the pouring outlet 11 smoothly. The above mentioned pouring window 32 may be formed, as shown in the drawings, located in the intermediary place between the right and left on the upper side of the rectangular part 35 which is cut out, forming a cut out part 36, which is half round. Because of the cut out part 36 that is half round, the liquid, which has been poured out, does not run sideways broadly, allowing for the slim and smooth pouring.

The upper surface of the head 21 of the above mentioned lid 2 is a little bit concave on the line connecting between the pouring outlet 11 and the grip 12 and on the said concave place 37, the upper lid 38 which opens and closes by support of the hinge, is attached.

The body support is given on the rear end position of the head 21, supporting the body axle 39 of the upper lid 38 in a way capable of turning, setting or removing. On the end of the upper lid 38, a retaining nail 40 is formed, for retaining and unlocking in a front position of the head 21 on the lid 2. In addition, on the part corresponding to the above mentioned pouring outlet 22, on the reverse surface of the lid, a protruding device 41 is formed in the shape of a ring, which is attached inside the round pouring outlet. It is designed to deter the leak of vapors.

Furthermore, to form a thin head 21 of the lid 2, the pouring outlet 22 is elevated so close to the upper end of the body 5 so that height of the pouring outlet 22 forms the upper end, making the upper surface of the lid 2 roughly plane.

When the liquid dropping out of the machines such as a coffee maker is poured into the vacuum bottle constructed in the above manner, first the upper lid 38 being closed as shown in the FIG. 1 is to be opened as shown in the FIG. 6. As the pouring outlet 22 is opened, the liquid is poured into this pouring outlet 22. The liquid which has been thus poured, goes through the pouring way 23 and runs out of the below opening part 25 of the extension material 26 and finally into the inner part of the inner container 4.

After a certain amount of the liquid is poured into the container and the upper lid 38 is closed, the upper lid 38 closes the pouring outlet 22, preventing the leakage of vapors, wherein the protruding device 41, formed below the upper lid 38, fits into the pouring outlet 22 in order to improve the above mentioned effects. In addition, as the control material 30 is formed on the extension material 26 while the inner opening part 18 can be reduced in respect of opening dimension, it is possible to deter the leak of vapors from the pouring outlet 11.

When the liquid is poured, the vacuum bottle 1 may be inclined by the grip as shown in the FIG. 7. The liquid passes through the inner opening part 18 to be regulated by the control material 30 so that the stream is arranged by the cut out part 33 and the stream arranging protrusion 34 and goes through the free space 31 and consequently the pouring window 32 and the pouring way 16 to be finally poured out of the pouring outlet 11.

As the upper lid 38 is attached onto the pouring outlet 22 of the lid 2, it is possible to bar the entry of trashes from the pouring outlet 22, which is formed in the shape of a funnel. In addition, above the height of the opening part 25 below the extension material 26 attached to the lid 2, there is formed a free space 31 not closing the inner opening part 18 of the body 5 so that there is not structure which might bar the pouring of the liquid, allowing for a smooth pouring of the liquid which may be adherent.

Furthermore, the upper lid 38 is attached in a way to allow for opening and closing by support of the hinge and it is very easy to open and close and also it can be done rapidly. Therefore, the effect can still be that the pouring of the liquid may be done without removing the lid 2. The support is so constructed as to allow for setting and removing as described above and it is possible to reduce the number of parts and pieces, making the assembly easy.

Furthermore, vapors going away off the pouring outlet 11 can be controlled by the control board 30, which is formed on the extension material 26 and on this control board 30, there is formed the cut out part 33 and the stream arranging protrusion 34, so that it is possible to pour the liquid into cups smoothly regardless of the amount of the liquid which has been kept inside.

In addition, as for the head 21 of the lid 2, if both right and left sides of the part 42 of the upper lid 38 are formed with a certain thickness as is shown in the vacuum bottle 1 according to the example in the FIG. 8, a design sense can be improved especially when the upper surface 43 is inclined inwards, however, when the head 21 of the lid 2 is formed like a disk as described above, it is possible to reduce the volume, thus allowing for reducing the costs involving the package or transportation.

Then, according to the vacuum bottle 1 in the above examples, the moving inner lid 44 in the shape of a donut which moves up and down, is located in a place corresponding to the above mentioned free space in order to prevent vapors from going away by shutting the connection between the pouring outlet 11 and the inner receiving part 4 when the vacuum bottle 1 is raised upright. However, as described above, by formation of the free space 31 and the control board 30 the reasonable effects can be obtained even when comparing with effects obtained by formation of the inner moving lid 44. Furthermore, even though the liquid is adherent as specified above, it is possible to obtain effects of smooth pouring. In addition, the number of parts and pieces can be reduced, thus allowing for an easy assembly and low costs.

What is claimed is:

1. In a thermos bottle comprising:

an outer container having an opening at a top thereof and a spout formed extending from said opening;

an inner container having an opening at a top thereof and disposed inside of said outer container with said opening thereof aligned with said opening of said outer container; and plug means positioned to fit within said aligned openings of said inner container and said outer container, said plug means comprising a passageway extending from said plug means and into said inner container, said passageway being constructed so that a curve thereof away from said spout so that a liquid is fed directly from outside said thermos bottle into said inner container so that a liquid contained within said inner container cannot flow back through said passageway when said thermos bottle is tilted to pour liquid through said spout from said inner container; the improvement comprising:

said plug means further comprising a first circular wall with an opening therein disposed to be adjacent to said spout; and an inner plate located below said first wall and having an extension located below said opening in said first wall and acting to smooth stream flow of said liquid through said spout.

2. The thermos bottle of claim 1, wherein said opening in said first wall is half round in shape.

3. The thermos bottle of claim 1, wherein said inner plate is located below said first wall with a space therebetween.

4. The thermos bottle of claim 1, wherein said plug means has a plurality of threads, and said openings have threads in said outer container so that said plug means is threaded into said openings by engaging with said threads in said outer container, and wherein said first wall extends from said threads.

5. The thermos bottle claim 1, wherein said plug means further comprises a concave reservoir formed above said passageway.

6. The thermos bottle of claim 1, wherein said passageway has an opening disposed to be opposite said spout.

* * * * *